United States Patent [19]

Rasnick et al.

[11] 3,721,479
[45] March 20, 1973

[54] GAS BEARING AND METHOD OF MAKING SAME

[75] Inventors: William H. Rasnick, Concord; Philip J. Steger, Oak Ridge, both of Tenn.

[73] Assignee: The United States of America as represented by the United States Atomic Energy Commission

[22] Filed: May 19, 1971

[21] Appl. No.: 144,953

[52] U.S. Cl. .............................. 308/9, 308/DIG. 1
[51] Int. Cl. .............................................. F16c 17/16
[58] Field of Search ........ 308/9, 122, DIG. 1, DIG. 5; 117/98

[56] References Cited

UNITED STATES PATENTS

| | | | |
|---|---|---|---|
| 3,156,399 | 11/1964 | Wadey | 308/9 X |
| 3,645,590 | 2/1972 | Bird et al. | 308/9 |
| 2,615,766 | 10/1952 | Wallace | 308/DIG. 5 |
| 3,527,510 | 9/1970 | Christiansen | 308/122 |
| 3,475,065 | 10/1969 | Weichsel | 308/9 X |
| 3,634,116 | 1/1972 | Woerner | 117/98 |

Primary Examiner—Allan D. Hermann
Assistant Examiner—Barry Grossman
Attorney—Roland A. Anderson

[57] ABSTRACT

An improved externally pressurized gas bearing and method of making same have been provided wherein the porous bearing surface is modified by a surface treatment which yields a boundary layer having selected permeability limits. The bearing materials are machined or formed by conventional means to the desired shape and size, then lapped to the desired surface finish and treated with an impregnant dissolved in a suitable solvent. The permeability of the bearing is then checked to determine areas of high permeability. The bearing surface is then selectively treated so as to provide uniform limited permeability at the surface of the bearing. This process provides restricted uniform gas flow to the bearing film at the bearing surface thereby providing improved operational stability by greater damping of self-induced or externally-induced vibrations of a load member supported for movement with respect to the bearing surface, independent of the bearing loading.

4 Claims, 3 Drawing Figures

PRESSURIZED
AIR
SUPPLY

INVENTORS.
William H. Rasnick
Philip J. Steger

GAS BEARING AND METHOD OF MAKING SAME

BACKGROUND OF THE INVENTION

The present invention was made during the course of, or under, a contract with the United States Atomic Energy Commission.

The invention described herein relates generally to gas bearings and more specifically to an improved gas bearing and method therefor wherein the porous bearing surface is treated by an impregnant to provide selected permeability limits at the bearing surface to improve operational stability characteristics.

The use of porous gas bearings in which a journal is supported on a thin film of gas supplied through the porous bearing material from an externally pressurized gas source is well known in the art. Further, gas bearings of the type in which the journal is in the form of a spherical or hemispherical segment are also well known and have been used in precision machine and inspection tools. The primary advantage of machines having gas bearing spindles lies in their high-rotation accuracy, low-maintenance requirement, and inherent thermal stability.

It is also well recognized in the art of compressed gas bearings that in order to prevent vibration there must be a limited amount of gas at a given pressure in communication with the lubricating gas film. In other words, there must be a restriction between the lubricating gas film and a compressed gas source so as to provide pressure compensation. One form of restriction in the prior art utilizes the porous bearing material with elaborate flow distribution means between the porous bearing material and the pressurized gas source to provide even gas distribution to the film. Further discussion with respect to this type of porous gas bearings may be had by referring to U.S. Pat. No. 3,475,065, issued Oct. 28, 1969, to R. H. Weichsel for "Gas Bearings Of The Linear Motion Single Plane Type."

Other systems in the prior art wherein spherical bearings are used employ elaborate systems of orifices and restrictor valves to accommodate variations in permeability of the bearing from one sector to another. These are expensive and often difficult to adjust so as to provide stable operation.

The above gas bearing systems have provided satisfactory operation for most general applications. However, under an operating condition of large mass moment as would occur when supporting long parts or under conditions of supporting very heavy loads, a self-excited instability has been noted in gas bearings of the prior conventional design. After considerable investigation, it was determined that the primary cause of instability resulted from excessive available porosity in the porous bearing material at the bearing film surface. In other words, the gas restriction was not close enough to the gas bearing film to provide sufficient damping. As was pointed out in the Weichsel reference, cited above, the porous bearing material forms gas restrictive pores varied through the thickness of the porous bearing material. Thus, it will be seen, as pointed out by Weichsel, that for large loads the porous bearing material thickness must be in keeping with that which is required to support the static or at rest load on the bearing surface, the larger the load the thicker the porous bearing must be in order to carry the static load. Therefore, it will be seen that in order to provide bearings for heavier loads in which the problem of instability has been recognized, the porous bearing material must be quite thick, thereby greatly increasing the available porosity in the bearing at the bearing film surface. Thus, it is apparent that there is a need for some means of providing a gas flow restriction as close to the bearing film surface as possible in order to provide stable operation, especially under excessive loading.

SUMMARY OF THE INVENTION

In view of the need for a gas bearing with greater operating stability, it is an object of this invention to provide an improved gas bearing having superior operating characteristics independent of the amount of loading on the bearing.

Another object of this invention is to provide a porous gas bearing which will supply the desired gas bearing film for stable dynamic operation of a gas bearing without the need for elaborate gas flow distribution means between a pressurized gas source and the porous bearing material.

Yet another object of this invention is to provide an improved bearing, wherein a porous bearing material is treated at the bearing film surface so as to provide gas flow restriction at the bearing film surface and thus reduce the available surface porosity of the bearing material, thereby greatly increasing the viscous damping of induced vibrations and thus provide significant improvement in operating stability.

In accordance with the present invention, an improved gas bearing has been provided which is of the porous permeable body type through which a gas is forced to provide a thin film for supporting a moveable member, wherein the improvement comprises a coating at the bearing film surface of the porous body provided by an impregnant penetrating a portion of the body so as to selectively control the permeability of the bearing surface boundary layer at a value less than that of the remaining portion of the body. As a result of the surface impregnation, the available surface porosity is reduced by at least an order of magnitude over similar non-treated porous bearings, and at the same time the flow characteristics of the material are modified so as to establish both uniform flow and the desired permeability.

Other objects and many of the attendant advantages of the present invention will be obvious from the following detailed description of the invention.

DETAILED DESCRIPTION

The invention will be described for application to a spherical zone air-bearing spindle used in machine tools for purposes of illustration only. It will be obvious to those skilled in the art that the invention is applicable to various other air bearing applications and is not limited to the illustrated application.

Figure 1:
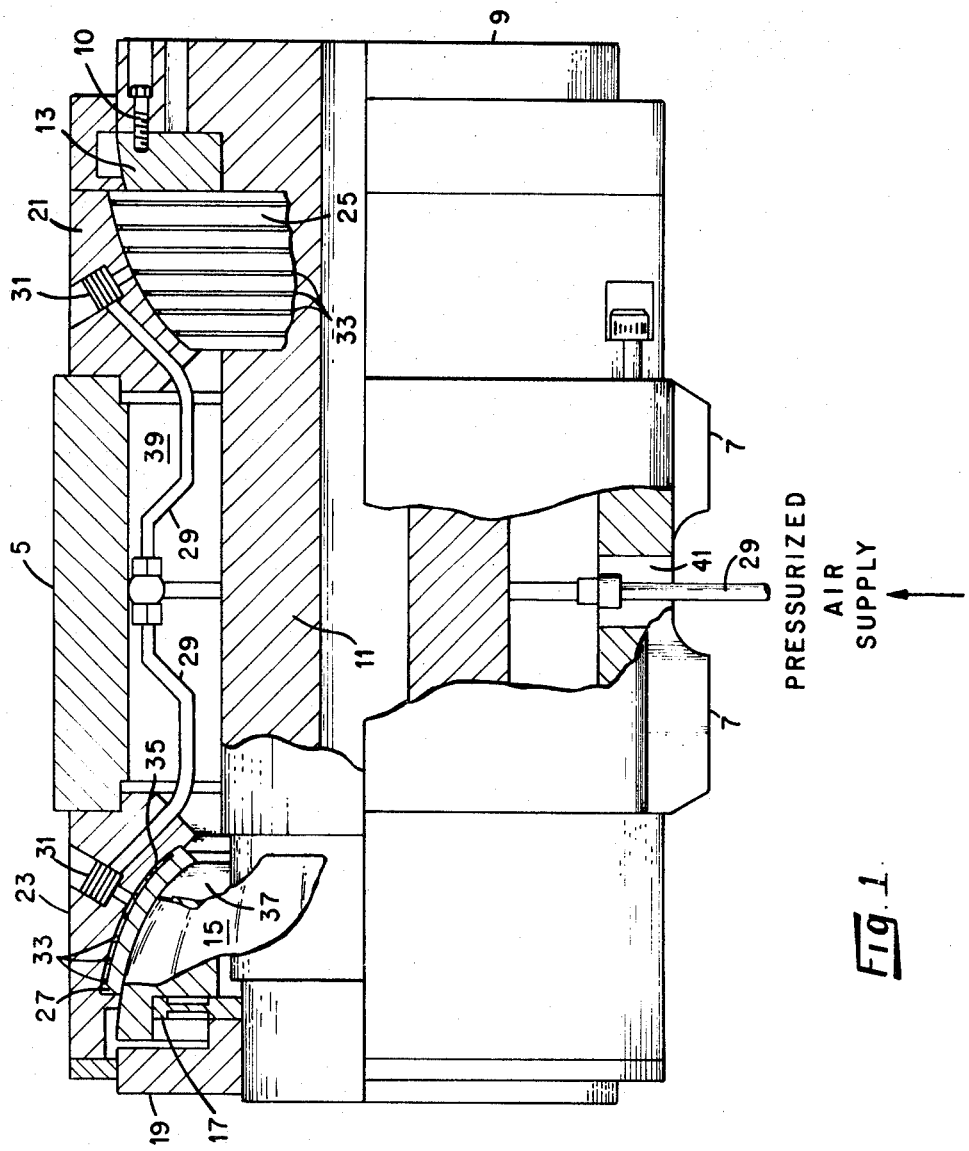
FIG. 1 is a sectional view of an air-bearing spindle employing hemispherical, self-aligning air bearings which have been modified according to the present invention.

Referring now to FIG. 1, there is shown an externally pressurized air-bearing spindle modified in accordance with the present invention. A cylindrical spindle housing 5 is adapted by means of support legs 7 to be mounted on a lathe or similar machine for supporting a workpiece in cantilever fashion from a front end mounting plate 9. The mounting plate 9 may be an integral part of a cylindrical spindle shaft 11 having a front bearing journal 13 consisting of a truncated hemispherical metal body which is preferably machined from hardened stainless steel. The journal 13 has a central opening adapted to be slidably fitted over shaft 11 from the rear and secured at the larger radius end to mounting plate 9 by conventional means such as bolts 10. The outer spherical surface of the journal is typically machined to a sphericity of ±0.002 inch for a spherical radius of 6 ±0.0003 inch and has a surface finish which varies from 10 to 30 microinches, rms.

The rear end of shaft 11 is fitted with a rear bearing journal 15 which is machined to the same specifications as the front journal 13, described above. However, the rear journal 15 is attached to the shaft 11 by means of a flexure ring 17 which is held in place by a balancing ring 19 attached to shaft 11. The flexure ring 17 is prestressed an amount equal to the force exerted by the bearing film pressure acting over its area. It provides a means of bearing journal position adjustment in axial direction and at the same time takes up axial expansion of the shaft due to temperature changes during operation.

Each of the journals 13, 15 is surrounded by bearing housings 21, 23, respectively, which hold the porous bearing liners 25, 27. Although a number of well known porous bearing materials may be used, graphite is preferred since it can be readily machined and lapped to a surface finish corresponding to the journal surface and will provide backup protection in the event of rubbing due to momentary overload or loss of air pressure in the film because of the self-lubricating property of graphite and the full surface area of the bearing pads.

Pressurized air is supplied through air-supply tubing 29 to each bearing through adjustable valves 31. The inlet air is distributed over the back surface of the porous bearing pads by means of circumferential flow channels 33. Each of the channels 33 is fed from a lateral channel 35 shown in section at the rear bearing pad 27, which is aligned in fluid communication with the outlet end of valve 31. Although the particular channel arrangement shown is preferred, especially for bearings carrying large static loads so as to provide sufficient support, the design is not critical as in prior bearing designs which required properly designed channels for even flow distribution. With the present improved bearing it is only necessary to provide a means of course distribution to the bearing where fine even control is provided by the improved inner bearing surface. Although the air supply lines may be connected to various sections of each bearing depending upon the bearing liner arrangement, only one air supply inlet is necessary with the improved bearing due to the improved flow distribution obtained through the present method of bearing surface penetration described hereinbelow.

One of the major problems experienced in fabrication of porous bearings was obtaining a porous material with the permeability necessary to meet design specifications. Flow test of one of the better graphite materials available (Grade ATJ - product of Union Carbide Corporation, Carbon Products Division, Cleveland, Ohio, and Grade 8882 - product of Speer Carbon Company, St. Mary, Pennsylvania) indicated considerable variation both between pieces of the same materials and over the area of the test piece itself. This problem has been compensated for in the past through the use of adjustable flow valves and restrictors in series with isolated sections of the entire graphite bearing which could be adjusted to give the over-all restriction required for bearing operation. However, under conditions of large mass moments as discussed above, a self-excited instability occurred in spindles of the above-described design. After considerable investigation it was determined that the primary cause of instability resulted from excessive available porosity in the graphite at the bearing film surface. As a result, the graphite pads were modified according to the present invention as at the inner surface 37 of bearing 27, by providing a surface impregnation of the graphite bearing pads which is effective in reducing available porosity by an order of magnitude, and at the same time modifying the flow characteristics of the bearing material to establish both uniformity and desired permeability.

According to the preferred form of the present invention, a graphite bearing, which may be of the spherical section type as described above and as shown in FIG. 1, is lapped at the bearing surface 37 to conform to the journal surface and to form a gas film region approximately 300 microinches thick between the bearing surface 37 and the journal surface at a film pressure in the range of from 50 to 60 psig. The gas exhaust from the bearing film enters the chambers 39 formed within the spindle housing 5 and exhausts through opening 41 in the lower portion of housing 5. The finished surface 31 of the porous bearing is modified by application of a solution which penetrates the surface layer and leaves a residue in the pores of the surface layer, thereby reducing the permeability of the graphite at the bearing surface. Since the graphite must have a substantial thickness to have the necessary structural strength, merely selecting graphite of the proper pore size would not solve the self-sustained vibration problem because the increased thickness provides an undesirably large compressive layer and further blind pores which do not communicate directly with the air supply tend to increase the available volume for compressibility.

In preparing the porous surface in accordance with the present invention, the bearing 53 (shown in section) is placed in a housing 51 (FIG. 2) which is adapted with low channels 52 which distribute air from the pressurized air supply to the bearing 53. A stethoscope-type probe 54 is connected by means of a tube 55 to a flow meter 56. The probe may be a cupshaped member 57 having an O-ring seal 59 attached to the periphery of the cup which seals off an area through which the flow is to be measured. By pressing the probe against the porous bearing surface 61, the gas flow through the graphite is determined in the area covered by the probe.

Figure 2:
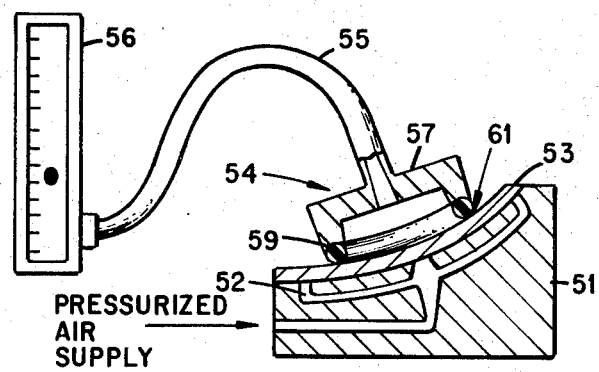
FIG. 2 is a schematic diagram of an apparatus for measuring the permeability of a gas bearing as shown in FIG. 1.

According to the process, an impregnant is dissolved in a suitable solvent and is then applied uniformly to the bearing surface by means of a cotton pad. After allowing about one minute for drying, the permeability is measured, as shown in FIG. 2, by moving the probe over the bearing surface to measure the air flow through the bearing. This process is repeated, applying the solution only to those areas determined to be outside the desired permeability limits, until the entire bearing exhibits the desired flow properties. No step in the impregnating treatment alters the dimensions or finish of the bearing surface. The impregnants penetrate the surface to form a boundary layer having a depth in the range of from 0.001 to 0.050 inch, leaving no residue on the surface thereof to alter the surface finish.

In order to more specifically illustrate the process, the following step-by-step example is presented wherein a porous graphite bearing is treated with an impregnating solution containing acrylic lacquer such as Du Pont 326L "Lucite," as the impregnant and methylene chloride as the solvent carrier.

EXAMPLE

1. Mix impregnating solution in the ratio of 1 part acrylic lacquer to 3 parts methylene chloride by volume. Cover solution when not in use to reduce evaporation of solvent from mixture.
2. Adjust bearing air supply pressure to approximately 40 psig and measure flow rate and uniformity over bearing surface.
3. Remove the supply pressure and apply a vacuum of approximately 25 inches Hg at the bearing.
4. Wet a small area of tissue, cotton pad or soft clean rag with impregnating solution and rub onto the entire bearing surface.
5. Bleed off vacuum to ambient conditions. Wipe the bearing surface with a clean tissue, cotton pad, or clean rag dampened with methylene chloride.
6. Allow approximately 1 minute to dry. Time can be shortened by using a heat blower.
7. Re-apply the bearing supply pressure and measure flow with probe. Readings should be lower than required. If not, repeat steps 3, 4, 5 and 6.
8. Establish an air pressure of approximately 5 psig at the bearing and wipe the graphite surface with cloth, tissue, or pad dampened with methylene chloride.
9. Allow the surface to completely dry.
10. Return the bearing supply pressure to approximately 40 psig and measure flow with probe.
11. Repeat steps 8, 9 and 10 until bearing flow is within the acceptable tolerance of evenly distributed flow over the bearing surface.
12. If flow measurements made in step 11 exceed that desired, return to step 5 and repeat the remaining process.

It will be noted from the above example that the process is reversible and although the preferred process is as specifically set forth it may be carried out as set forth above wherein the bearing surface is selectively coated until the desired tolerance is obtained. Either method has been shown to be an effective means of reducing a porous gas bearing's susceptibility to self-excited vibrations or "pneumatic hammer."

Although pitch, pin tar, coal tar, and polystyrene dissolved in an organic solvent, such as alcohol, acetone, methylene chloride or benzene, provided the same satisfactory result as an impregnant, each had inherent disadvantages in preparing the solution or applying the solution to the bearing surface. For example, pitch, which works quite well, has two inherent disadvantages: (1) a low softening point, 150°–180°F, and (2) considerable preparation is required before actual use (powdering, dissolving, filtering, drying and redissolving). Speed and ease of application, bonding ability, penetration, resistance to rubbing friction of the bearing, and resistance to moisture and solvents were the factors considered when searching for the best impregnating material and technique. Both the impregnant and the solvent must wet the bearing surface in order to be useful as a modifier.

Although in normal operation of an air bearing there is always an air film between the graphite bearing and journal, occasions arise when this film is broken down and the journal rubs against the bearing. Any impregnated material must withstand such a situation without appreciably changing its properties. Impregnated test pads were loaded in a special test device at a pressure of between 40 and 50 psi and rubbed for 15 seconds against a polished metal disc rotating at 500 rpm at a 2.5 inch radius. With this test it was determined that pine tar dissolved in alcohol and 350 pitch dissolved in acetone provided the least change in flow rate through the bearing. Clearly, a correlation exists between penetration of the impregnating solution and the effect of rubbing friction.

Figure 3:
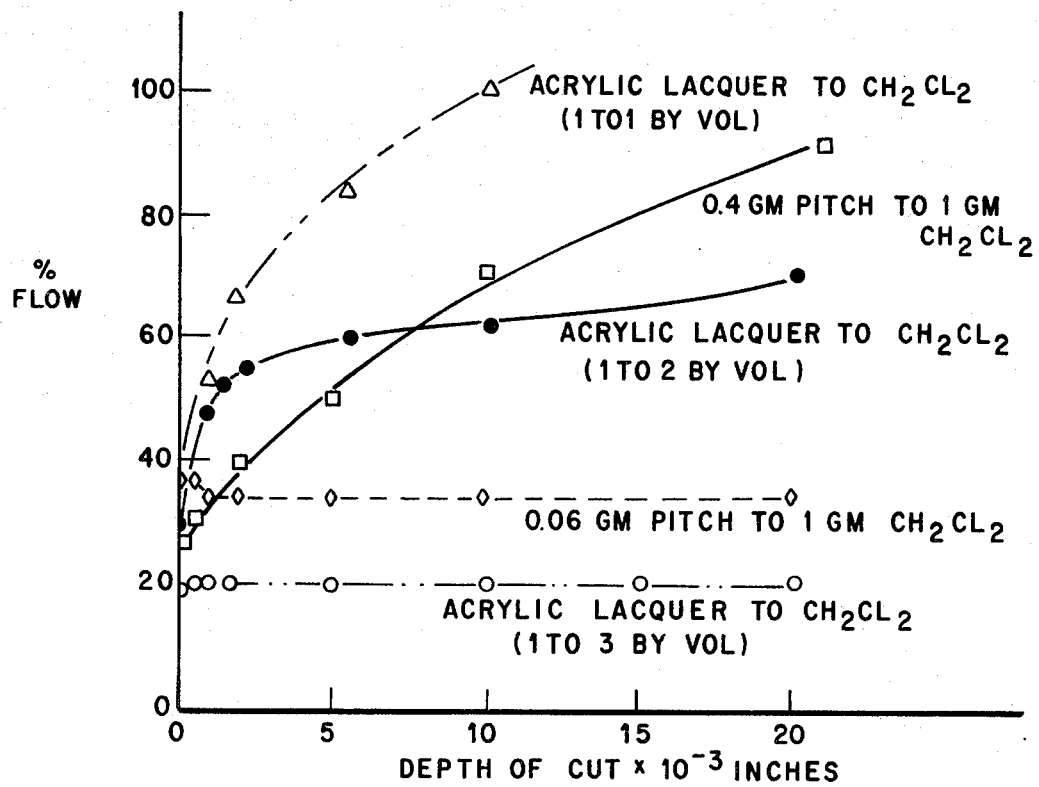
FIG. 3 is a plot showing the depth of penetration of various impregnants in a porous graphite bearing treated in accordance with the present invention.

To measure the depth of impregnation, a series of tests were run by impregnating a sample, facing-off a certain distance from the sample, and measuring the flow after each cut. FIG. 3 shows a plot of the flow after impregnation as a percentage of flow before impregnation versus the depth of cut for both acrylic lacquer and pitch dissolved in methylene chloride ($CH_2Cl_2$). The effect of viscosity as reflected in the concentration of solution can be seen to strongly influence the depth of penetration. The penetration depth is also dependent upon the vacuum applied during application, the permeability of the graphite and the boiling point of the solvent carrier. It will be seen from the plots of FIG. 3 that the available porosity at the surface boundary layer is significantly reduced while the gas flow restriction is also provided at the bearing-gas film interface.

The process provides a bearing surface having the desired permeability, which improves the dynamic stability of the gas bearing. The improved stability results from not only improved uniformity of the porous surface but due to the fact that flow restriction, in the form of properly sized pores, has been moved to the immediate vicinity of the supporting air film. The properly sized pores act as local flow restrictors and in conjunction with the reduced porosity at the bearing surface cause the compression of the thin supporting gas film to provide greater damping of vibration. The remaining portion of the porous body becomes a part of the pressurized air supply which feeds the surface restrictors and thereby provides even distribution of air supply to the bearing gas film.

To further demonstrate the utility of this invention, a 12-inch diameter spherical air bearing, as shown in FIG. 1, was impregnated at the bearing surfaces 37 by the method described hereinabove using pitch dissolved in acetone. Before impregnation of the bearing surface, the spherical bearing spindle became unstable and was susceptible to self-induced vibration at loads over 150 pounds. After impregnation, the spindle was stable at loads up to 500 pounds.

Although various materials have been tested as candidates for impregnating a porous bearing surface, acrylic lacquer or pitch dissolved in a suitable solvent, such as methylene chloride or acetone, is preferred. It will be obvious to those skilled in the art that various other materials with proper solvents that will wet and penetrate the particular porous bearing material being modified may be used in accordance with the teachings of this invention.

It has been demonstrated that this invention is applicable to pad-type air bearings as used on air bearing tables, double-arm sweep gauges and the like. An air bearing rotary table having conventional external flow restrictors was found to be unstable at all loading conditions, rendering it ineffective for use with inspection instrumentation. However, after treatment of the porous bearing surface as described herein, the threshold stability of the system was increased so that no amount of loading or external excitation produced vibration.

It will be seen that an improved gas bearing and method of making same have been provided in which self-exited instabilities are no longer a problem in gas lubricated bearings especially for excessive loading. The method is reversible so that overapplication or errors in calculations can be corrected without fabrication requirements. Also, the impregnating material is applied to the finished bearing surface, measured immediately, changed at will and to a small enough area to establish uniform permeability.

What is claimed is:
1. An improved gas bearing, comprising:
   a porous permeable body having surfaces at opposite sides thereof, one of said surfaces being contiguous with a gas bearing film for supporting a moveable member;
   a flow restricting impregnant penetrating a portion of said body contiguous with said one surface forming a uniform permeability boundary layer at the entire surface which is less permeable and of lower porosity than the remaining portion of said body; and
   a source of pressurized gas connected in fluid communication with the surface of said body opposite said one surface so that gas is forced through said body and restricted by said boundary layer thereby maintaining uniform distribution of gas to said gas film.
2. The improved gas bearing as set forth in claim 1 wherein said porous permeable body is made of graphite.
3. The improved gas bearing as set forth in claim 2 wherein the impregnant is selected from the group consisting of pine tar, coal tar, pitch, acrylic lacquer and polystyrene.
4. The improved gas bearing as set forth in claim 3 wherein the depth of said boundary layer is in the range of from 0.001 to 0.050 inch.

* * * * *